(No Model.)
C. D. DANIELS.
COMBINED FERTILIZER DISTRIBUTER AND SEED DRILL.
No. 362,943. Patented May 17, 1887.
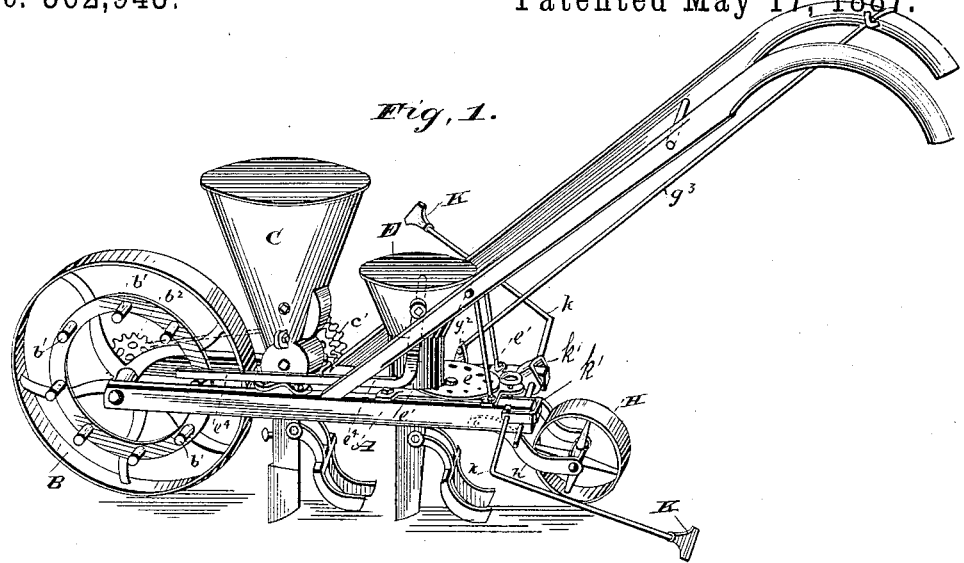
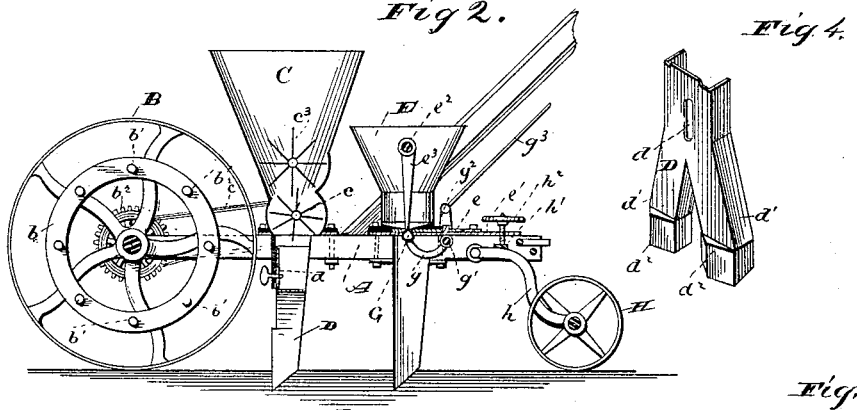
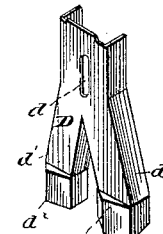
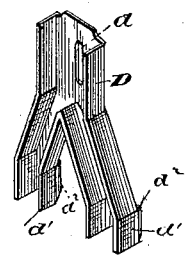
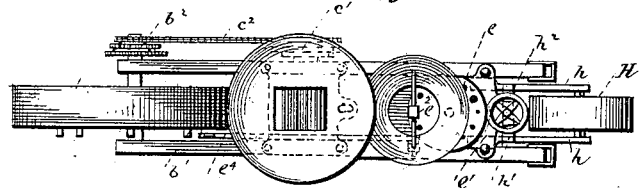
WITNESSES:
INVENTOR:
Cyrus D. Daniels
BY
H. T. Fisher
ATTORNEY
N. PETERS, Photo-Lithographer, Washington, D. C.

UNITED STATES PATENT OFFICE.

CYRUS D. DANIELS, OF MADISON, OHIO.

COMBINED FERTILIZER-DISTRIBUTER AND SEED-DRILL.

SPECIFICATION forming part of Letters Patent No. 362,943, dated May 17, 1887.

Application filed March 6, 1886. Serial No. 194,204. (No model.)

*To all whom it may concern:*

Be it known that I, CYRUS D. DANIELS, a citizen of the United States, residing at Madison, in the county of Lake and State of Ohio, have invented certain new and useful Improvements in Combined Hand Fertilizers and Seed-Drills; and I do hereby declare that the following is a full, clear, and exact description of the invention, which will enable others skilled in the art to which it appertains to make and use the same.

My invention relates to improvements in combined hand fertilizers and seed-drills.

The object of the invention is to produce a combined machine for distributing fertilizer and drilling small seeds—such as onion-seeds—at the same time; and the invention consists in certain details of construction and combination of parts, as hereinafter fully described, and particularly pointed out in the claims.

In the accompanying drawings, Figure 1 is a side elevation of a machine embodying my improvements. Fig. 2 is a longitudinal section of the same. Fig. 3 is a plan view with the handles, markers, and other details detached. Fig. 4 is an enlarged front view of the fertilizer-spout, and Fig. 5 a rear view thereof.

A represents a frame, which may be made of any convenient form, that shown being preferred.

B is the drive-wheel, mounted in the front of the frame. On the spokes of this wheel I secure a band, $b$, provided with tappets $b'$ at intervals, which project a short distance laterally beyond the edge of the wheel, and on the axle of the said wheel I secure a series of graduated sprocket-wheels, $b^2$, the object of which elements will appear further along.

C is a fertilizer-hopper formed with the outlines shown, and extending a short distance below the frame A. In this hopper is located a force-feed wheel, $c$, having vanes radiating from its axle, which extend across the full width of the hopper at that point and serve to force the fertilizing material in uniform quantities to the delivery-spout of the hopper. On the outer end of the axle of the feed-wheel $c$ is a series of graduated sprocket-wheels, $c'$, running in reverse order to the sprocket-wheels $b^2$, and connected therewith by an endless chain, $c^2$, whereby power is communicated to the feed-wheel $c$. Above the feed-wheel $c$ is arranged an agitator, $c^3$, whose arms mesh with the vanes of the feed-wheel and are rotated thereby.

The hopper C is made in two parts, bolted together. By shifting endless chain $c^2$ to larger or smaller sprocket-wheels in the series on the shafts bearing said wheels the revolutions of the force-feed wheel can be regulated so as to deliver the fertilizer more or less rapidly, as may be preferred. To regulate the quantity delivered with comparative certainty, the hopper is formed with cylindrical sides about the feed-wheel, forming a chamber. The vanes of the wheel pass closely along the sides of said chamber, and thereby measure the fertilizing material carried between the vanes to the delivery-spout.

In common practice the fertilizing material is sown in the furrow or opening formed for the seed. Frequently both fertilizer and seed are delivered through the same spout and are covered together. Experience, however, has demonstrated that it is best for the plant, particularly in dry weather, that the fertilizer should not be sown immediately with the seed, as there is greater liability to burn out the plant and lose the good effects of the fertilizer by having them together. Hence I have devised a distributer which will avoid this objection and place the fertilizing material in respect to the plant where it will serve the purpose for which it is intended, and yet not be liable under certain conditions to injure the plant or retard its growth. To this end I construct a bifurcated distributing-spout, D, which is provided with a slot, $d$, through which it is adjustably attached to the bottom of the hopper C by a set-screw working in the hopper.

In operation the volume of fertilizing material dropping down through the bottom of the hopper is split at the angle of the legs $d'$ $d'$, and equally distributed to the channels formed in said legs. Then by adjusting the depth of the distributing-spout according as the fertilizing material is to be deposited—deep or shallow—a device is formed whereby the said material can be evenly distributed on either side of the drill apart from the seed, yet in such close proximity as to get the benefit of the fertilizer at all stages of the growth of the plant. In practice I prefer to deposit the fertilizer at a higher level than the seed, depending on moisture to sink and distribute it in solution about the roots of the plant. Each of the legs $d'$ $d'$ is provided with suitable openers, $d^2$ $d^2$. The channels in the legs $d'$ $d'$ are open at the rear; but they may be closed, if desired, and the form of the distributer may be varied so that the legs may be circular instead of angular.

E is a seed-hopper, located on the rear of the frame A and behind the fertilizer-distributer. In the bottom of this hopper is a central orifice for the passage of the seed, which registers with a series of openings of varying size, graduated from large to small, in a disk, $e$, which is pivoted at its center to connecting-plate $e'$, and is adapted to be rotated about its pivot-point horizontally, so as to bring any one of its openings in line with the orifice in the bottom of the hopper E, whereby the flow of seed from said hopper may be accurately determined and regulated. Transversely in the top of the hopper E is arranged a shaft, $e^2$, having a single agitating hanger or finger, $e^3$, which is vibrated to and fro over the seed-orifice by means of a bent lever or rod, $e^4$, rigidly fixed to the shaft $e^2$ outside of the hopper, and operated by the tappets on the drive-wheel. This construction might, of course, be modified so as to take the action from the sprocket-wheels $c'$ outside the fertilizer-hopper or from a projection on the same shaft on the other side of the hopper, or by some other arrangement which would serve to vibrate the finger $e^3$ and prevent clogging of the seed.

The flow of seed through the orifice in the bottom of hopper E is controlled by a ball-valve, G, having a curved arm, $g$, by which it is rigidly attached to a shaft, $g'$, located in suitable bearings transversely of the frame behind the seed-hopper. On one end of the shaft $g'$ is a rigid arm, $g^2$, to which is attached a rod or lever, $g^3$, secured to the handle of the machine by a hook or other suitable contrivance. It will be observed that the valve G is located beneath and apart from the hopper, having no connection whatever with it except when it is used to close the seed-orifice.

If it is desirable to have a distributer below the seed-orifice to scatter the seeds somewhat in the drill, the valve may be so adjusted in relation to the opening that it will serve this purpose. Otherwise the valve is wholly removed from the opening, and the flow of seed is regulated by the openings in the disk $e$. A seed spout or shoe, which also serves as an opening, is secured to the under side of the tie or connecting plate $e'$, on which the seed-hopper rests, and beneath said hopper.

The rear supporting-wheel, H, is connected to the frame A by the curved bars $h$ $h$, attached to the ends of its axle and pivotally secured to the inside of the side rails of the frame. Back of the pivot-point a short distance is a brace-piece, $h'$, which serves to connect the bars $h$ $h$ and to form a bearing for a hand-screw, $h^2$, that projects through the end of the connecting-plate $e'$, and is used to determine and fix the working depth of the machine in relation to the wheels. The special construction of these parts is, however, not material, as an ordinary caster-wheel with adjustable connections or other form of attachment whereby the wheel and frame might be adjusted in relation to each other would serve my purpose. I, however, prefer the construction shown.

A machine of the character herein described is not considered complete without suitable markers, and such I have shown in this case. These markers are designated by letters K K, one on each side of the machine. Each marker is attached to the frame through transverse openings running from side to side by right-angled rods $k$ $k$. Stirrups $k'$ $k'$ are secured to each of the rods $k$ $k$ by set-screws, which, after the rods have been so adjusted as to place the markers the designed distance from the machine, are fastened firmly on the rods, thus furnishing a device convenient to be caught by the toe of the shoe for throwing the marker up out of working position.

The transverse openings for the rods $k$ $k$ are so located in relation to each other that both stirrups will be accessible when the markers are down. These markers are used alternately, according to the direction of travel. The disk $e$ serves two purposes—viz., to regulate the flow of any kind of seed by running it through larger or smaller openings in said disk, or to adapt the planter to sow seeds of different sizes, the smaller openings being used with the smaller or finer seeds.

Covers of any suitable construction are attached to both the fertilizer and seed spouts. If it is found desirable to take on more fertilizing material than the hopper, as ordinarily constructed, will hold, a conical or other extension may be added.

Having thus described my invention, what I claim, and desire to secure by Letters Patent, is—

1. In a fertilizing-machine, a cylindrical chamber extending transversely of the frame and a force-feed wheel, the vanes or blades of which extend from end to end in the chamber and work closely against its sides, in combination with an agitator located in the hopper above the cylindrical chamber and meshing with the blades of the force-feed wheel, substantially as set forth.

2. In a fertilizing-machine, a delivery-spout bifurcated or split from a point near its longitudinal center and forming two separate legs from that point, each of which is provided with a fertilizer-channel, whereby the volume of fertilizer is equally divided at the intersection of the legs and carried through the separate channels, substantially as set forth.

3. In a fertilizing-machine, a bifurcated delivery or distributing spout provided with openers on its legs and a slot above the angle where the legs meet, in combination with a hopper projecting below the main frame and having a set-screw for adjustably attaching the delivery-spout to said projections, as set forth.

4. In a combined seed and fertilizer distributer, markers on each side of the machine, having ends bent at right angles and extending through the frame of the machine, in combination with stirrups embracing the ends of the frame and perforated for the passage of the marker-rods, with set-screws by which the said rods may be adjustably fixed in the stirrups, whereby said stirrups serve to hold the markers in the desired position, and by extending back from the ends of the frame serve as a catch for the foot to tilt the markers, substantially as set forth.

5. In a combined seeder and fertilizer, a fertilizer-distributing spout formed with two diverging legs having channels and openers, in combination with a single seed-spout arranged to deliver seed midway between the furrows formed by the openers of the fertilizer-spout, substantially as set forth.

CYRUS D. DANIELS.

Witnesses:
   FRANK B. HUBBARD,
   GEORGE J. SMITH.